(12) United States Patent
Håland et al.

(10) Patent No.: US 12,298,922 B2
(45) Date of Patent: May 13, 2025

(54) PERIPHERAL INTERCONNECT CONTROLLER

(71) Applicant: Nordic Semiconductor ASA, Trondheim (NO)

(72) Inventors: Pål Håland, Trondheim (NO); Carsten Wulff, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 167 days.

(21) Appl. No.: 18/039,362

(22) PCT Filed: Dec. 1, 2021

(86) PCT No.: PCT/NO2021/050247
§ 371 (c)(1),
(2) Date: May 30, 2023

(87) PCT Pub. No.: WO2022/119448
PCT Pub. Date: Jun. 9, 2022

(65) Prior Publication Data
US 2024/0004805 A1    Jan. 4, 2024

(30) Foreign Application Priority Data

Dec. 1, 2020 (GB) ...................................... 2018921

(51) Int. Cl.
*G06F 13/12* (2006.01)
(52) U.S. Cl.
CPC .................................. *G06F 13/122* (2013.01)
(58) Field of Classification Search
None
See application file for complete search history.

(56) References Cited

U.S. PATENT DOCUMENTS 6,243,785 B1 *  6/2001  Lowe ...................... G06F 13/24
                                                        710/48
6,859,831 B1     2/2005  Gelvin et al.
(Continued)

FOREIGN PATENT DOCUMENTS

EP          2 107 684 A1    10/2009
WO    WO 2008/125670 A1    10/2008
WO    WO 2020/002423 A1     1/2020

OTHER PUBLICATIONS

ISO Search Report under Section 17(5) for GB2018921.3, mailed Sep. 1, 2021, 4 pages.

(Continued)

*Primary Examiner* — Elias Mamo
(74) *Attorney, Agent, or Firm* — Klarquist Sparkman, LLP

(57) ABSTRACT

There is disclosed an electronic device and a method of operating an electronic device. It has peripherals which each have one or more event outputs or task inputs, connected to a peripheral interconnect. The device also has a controller for configuring the peripheral interconnect and a memory, which are communicatively coupled to a bus system. The peripheral interconnect receives configuration data from the controller, which selectively connects peripheral event outputs and task inputs. The controller uses the bus system to access a sequence of instructions in a script stored in the memory. Each instruction in the sequence identifies a peripheral task input, event output and a second peripheral event output. Each subsequent instruction in the sequence is implemented in response to detecting an event signalled from the second peripheral event output identified by the preceding instruction in the sequence.

20 Claims, 5 Drawing Sheets

(56) References Cited

U.S. PATENT DOCUMENTS

| | | | | |
|---|---|---|---|---|
| 7,409,478 | B2* | 8/2008 | Kreiner | G06F 13/385 |
| | | | | 710/72 |
| 7,580,685 | B2* | 8/2009 | Kanazawa | H04M 1/6041 |
| | | | | 348/14.02 |
| 8,638,819 | B2* | 1/2014 | Chen | H04B 1/0057 |
| | | | | 370/280 |
| 8,812,746 | B2* | 8/2014 | Azam | G06F 9/4411 |
| | | | | 710/36 |
| 2007/0178946 | A1 | 8/2007 | Palum et al. | |
| 2016/0267038 | A1 | 9/2016 | Elahi et al. | |
| 2017/0308502 | A1 | 10/2017 | Hindle et al. | |

OTHER PUBLICATIONS

International Search Report and Written Opinion for PCT/NO2021/050247, mailed Mar. 15, 2022, 15 pages.

Nordic Semiconductor ASA Product Specification, "PPI—Programmable peripheral interconnect," downloaded from the internet: https://infocenter.nordicsemi.com/topic/com.nordic.infocenter.nrf52832.ps.v1.1/ppi.html, Nov. 2020, 50 pages.

Nordic Semiconductor ASA Product Specification, "RADIO—2.4 GHz Radio," downloaded from the internet: https://infocenter.nordicsemi.com/topic/com.nordic.infocenter.nrf52832.ps.v1.1/radio.html?cp=4_2 0_22, Nov. 2020, 42 pages.

Nordic Semiconductor ASA Product Specification, "TIMER—Timer/counter," downloaded from the internet: https://infocenter.nordicsemi.com/topic/com.nordic.infocenter.nrf52832.ps.y1.1/timer.html?cp=4_2_0 _23, Nov. 2020, 10 pages.

* cited by examiner

PERIPHERAL INTERCONNECT CONTROLLER

CROSS REFERENCE TO RELATED APPLICATIONS

This is the U.S. National Stage of International Application No. PCT/NO2021/050247, filed Dec. 1, 2021, which was published in English under PCT Article 21(2), which in turn claims the benefit of Great Britain Application No. 2018921.3, filed Dec. 1, 2020.

BACKGROUND OF THE INVENTION

This invention relates to electronic devices having peripheral interconnects.

WO 2013/088121, by the present applicant, describes a configurable peripheral interconnect for system-on-chip devices that enables peripherals to signal events to each other, in order to trigger tasks on other peripherals, over channels provided by the peripheral interconnect. This can enable interaction between peripherals to occur autonomously, over a dedicated interconnect, without needing to be mediated directly by the system processor over the main bus system, e.g. using processor interrupts. This can provide substantial power savings by allowing the processor to remain in a sleep state while peripherals communicate directly with each other. It can also enable quicker communication between peripherals.

However, the applicant has now recognised that this approach can be further improved upon to support additional functionality.

SUMMARY OF THE INVENTION

From a first aspect, the invention provides an electronic device comprising:
a plurality of peripherals each peripheral comprising one or more event outputs or task inputs;
a peripheral interconnect, coupled to each of the peripheral event outputs and peripheral task inputs;
a controller for configuring the peripheral interconnect;
a memory; and
a bus system, communicatively coupled to the controller and to the memory,
wherein the peripheral interconnect comprises:
an input for receiving configuration data from the controller; and
circuitry, responsive to the received configuration data, for selectively connecting peripheral event outputs to peripheral task inputs, and wherein the controller is configured to:
access, over the bus system, a script comprising a sequence of instructions, stored in the memory, the sequence comprising a first instruction and one or more subsequent instructions, wherein each instruction identifies a first peripheral event output, a peripheral task input, and a second peripheral event output;
implement each instruction of the sequence of instructions by sending respective configuration data to the peripheral interconnect for configuring the peripheral interconnect to connect the first peripheral event output identified by the instruction to the peripheral task input identified by the instruction; and
implement each subsequent instruction in the sequence of instructions in response to detecting an event signalled from the second peripheral event output identified by the preceding instruction in the sequence of instructions.

From a second aspect, the invention provides a method of operating an electronic device, wherein the electronic device comprises:
a plurality of peripherals each peripheral comprising one or more event outputs or task inputs;
a peripheral interconnect, coupled to each of the peripheral event outputs and peripheral task inputs;
a controller for configuring the peripheral interconnect;
a memory; and
a bus system, communicatively coupled to the controller and to the memory, wherein the peripheral interconnect comprises:
an input for receiving configuration data from the controller; and
circuitry, responsive to the received configuration data, for selectively connecting peripheral event outputs to peripheral task inputs, the method comprising the controller:
accessing, over the bus system, a script comprising a sequence of instructions, stored in the memory, the sequence comprising a first instruction and one or more subsequent instructions, wherein each instruction identifies a first peripheral event output, a peripheral task input, and a second peripheral event output;
implementing each instruction of the sequence of instructions by sending respective configuration data to the peripheral interconnect for configuring the peripheral interconnect to connect the first peripheral event output identified by the instruction to the peripheral task input identified by the instruction; and
implementing each subsequent instruction in the sequence of instructions in response to detecting an event signalled from the second peripheral event output identified by the preceding instruction in the sequence of instructions.

Thus it will be seen that embodiments of the invention provide a scripting mechanism that allows the connections between events and tasks, through the peripheral interconnect, to be changed dynamically over time according to a script stored in the memory of the device. In particular, the controller advances through the instructions of the script (corresponding to different configurations of the interconnect) in response to events signalled by one or more peripherals, as determined by the script itself.

This enables the controller to be scripted very flexibly. It can also, at least in some embodiments, enable the peripheral interconnect to be reconfigured rapidly and with precise timing accuracy. This may be particularly advantageous where the operations of one or more of the peripherals are time-critical, such as for a radio peripheral that is performing a distance ranging procedure with another independent device, where clock-cycle timing precision may be desirable for ensuring accurate ranging estimates.

The peripherals may include a hardware timer, which may comprise:
a configuration input for receiving configuration data representative of a time;
a timer event output; and
circuitry, responsive to the received configuration data, for signalling a timer event from the timer event output at said time.

Each instruction may further identify a respective time, and the controller may be configured to send configuration data to the hardware timer for configuring the hardware timer to signal a respective timer event at the respective time.

This can further enhance the utility of the script mechanism by allowing a single script instruction to configure the timer and the peripheral interconnect to trigger a peripheral task at a particular time, by identifying the timer event output as the first peripheral event output in the instruction. It can also allow a single script instruction to configure the timer and the peripheral interconnect to trigger the implementing of the subsequent instruction at a particular time, by identifying the timer event output as the second peripheral event output in the instruction. Some instructions in the script may do both of these together in the same instruction, thereby enabling the timer to be used efficiently both to trigger peripheral tasks at particular times and to advance the script interpretation in synchronisation with the task triggering.

The controller may send the respective timer configuration data when implementing each instruction in turn. In this way, the controller may write sequentially to a single compare register of the hardware timer. This may advantageously allow the timer to be relatively simple, or use only minimal resources of a more complex timer. It may also enable the controller to be implemented with less complexity. However, in other embodiments, the controller may send configuration data representative of a plurality of times, identified in a respective plurality (e.g. all) of the instructions, to the hardware timer in a batch.

Peripherals may be configured to send an electrical signal (e.g. a pulse) from an event output in response to an event associated with the event output occurring in the peripheral. Peripherals may be configured to receive an electrical signal (e.g. a pulse) at a task input and to respond by performing a task associated with the task input.

The peripheral interconnect may comprise a switch matrix. It is preferably distinct from the bus system. At least in some embodiments it is not directly coupled to the memory. The peripheral interconnect may comprise an interface unit for receiving configuration data. The interface unit may provide a register interface on the bus system. The controller may be configured to send the configuration data to the peripheral interconnect over the bus system. The peripheral interconnect may support a plurality of simultaneous connections (referred to herein as channels) between a respective event output and a respective task input. However, in some embodiments, the controller is configured to instruct the peripheral interconnect to use the same channel for connecting the first peripheral event output to the peripheral task input, for every instruction in the script. This can be resource efficient and allow other channels (where present) to be made available for other purposes.

It will be appreciated that electronic devices can embody the invention without actually having any script stored in the memory (e.g. before any scripts have been loaded). Nevertheless, in some embodiments, the memory does already store a script, which comprises a first instruction and one or more subsequent instructions, wherein each instruction identifies a first peripheral event output, a peripheral task input, and a second peripheral event output.

The controller may be configured to access a script of any format. The instructions may be encoded in any way. A time in an instruction may be represented as a counter value for the hardware timer. An event output or task input may conveniently be represented by a memory address of a register associated with the event output or task input, but any other label or name supported by the peripheral interconnect may be used. In some embodiments, the script occupies a contiguous address range in the memory, with the sequence of instructions stored in sequence through the address space. Each instruction may have the same size in memory. The controller may be configured to access the script by reading from a contiguous block of memory. It may read each instruction by incrementing an address pointer through the memory, e.g. in uniform steps. It may read the whole script at once, but preferably first reads each instruction when implementing the instruction—i.e. sequentially in turn while interpreting the script. This can enable the controller to be implemented very efficiently, which may be beneficial, especially when the controller is implemented in hardware rather than software.

The electronic device may comprise a processor, communicatively coupled to the controller and to the memory.

In a first set of embodiments, the controller is implemented by software instructions, stored in the memory, for execution by the processor.

In a second set of embodiments, the controller is implemented by hardware, independently of any processor of the electronic device. The hardware may comprise registers and combinational logic (i.e. dedicated circuitry comprising digital logic gates). This may enable more power-efficient and/or resource-efficient performance than a software controller implementation. It may also enable even more precise timing control, at least in some embodiments.

In the first set of embodiments, a script may be associated with one or more software helper functions stored in the memory. Each instruction in the script may identify an event output and/or task input by a pointer to a respective helper function which may comprise data that identifies the respective event output or task input (e.g. as a constant of the function). This can enable one or more of the helper functions, when executed, to cause the processor to perform one or more further operations, thereby increasing the flexibility of the scripting mechanism.

In order to support real-time interpreting of the script, the software controller may comprise a blocking function. It may prevent the processor from servicing one or more interrupts. The second peripheral event, identified by an instruction of the script, may be signalled by a change to a register associated with the second peripheral event. The software controller may be configured to poll the register associated with the second peripheral event output to detect the event.

In the second set of embodiments, the controller may be a bus master on the bus system. It may be configured to use direct memory access (DMA) to read the script from the memory. It may provide a register interface, accessible of the bus system. This can enable software executing on a processor of the device to configure the controller. The register interface may comprise an input for receiving data identifying a location of a script in the memory (e.g. an address pointer). It may comprise an input for receiving data identifying the number of instructions in the script. The controller may comprise an input for receiving a signal to start interpreting the script, which may comprise an input register, or a task input from the peripheral interconnect, or both. The controller may comprise an output for signalling finishing a script, which may comprise an output register, or an event output coupled to the peripheral interconnect, or both.

The hardware controller may comprise a controller task input coupled to the peripheral interconnect. The second peripheral event output, identified by an instruction of the script, may be signalled by an event signal from the event output to the peripheral interconnect. The controller may be configured, when implementing each instruction of the script, to send configuration data to the peripheral interconnect for configuring the peripheral interconnect to connect the second peripheral event output identified by the instruction to the controller task input. In this way, the controller can detect the event, signalled from the second peripheral event output, over the peripheral interconnect.

The plurality of peripherals may include a radio peripheral, which may comprise:
radio transceiver circuitry; and
one or more task inputs, each associated with a different operation of the radio transceiver circuitry, wherein the radio transceiver circuitry is configured to perform a respective operation in response to receiving an electrical signal at the respective task input of the plurality of task inputs.

The tasks may include one or more of: switching the radio to a transmit mode; switching the radio to a receive mode; and starting transmitting a radio signal.

In such embodiments, a script may be used to connect the hardware timer to different task inputs of the radio at different times, so as to enable the radio to perform complex sequences of transmission and reception, potentially with reduced or no involvement by a processor of the device.

The radio peripheral may comprise one or more event outputs, each associated with a different event detected by the radio transceiver circuitry, wherein the radio transceiver circuitry is configured to output an electrical signal from the respective event output in response to detecting the respective event.

The events may include detecting a predetermined data sequence (e.g. an access address) in a received radio signal. The radio peripheral may be configured to signal this event within a constant time of receiving the data sequence.

The radio peripheral may support a Bluetooth™ radio protocol. It may support Bluetooth™ Low Energy.

The device may be configured to perform a radio ranging procedure. The memory may store a script for configuring the peripheral interface for performing the radio ranging procedure. The script may configure the peripheral interconnect to connect a hardware timer of the device to a plurality of different task inputs of the radio peripheral at different respective times. The controller and peripheral interconnect may be configured to support cycle-accurate timing when implementing the script. This may help provide precision in the output of the ranging procedure.

The device may be or may comprise an integrated-circuit chip, such as a system-on-chip. It may be or comprise a radio-on-a-chip. It may comprise, or be connectable to, one or more off-chip components, such as a power supply, antenna, crystal, discrete capacitors, discrete resistors, etc.

The device may comprise one or more processors, DSPs, logic gates, amplifiers, filters, digital components, analog components, non-volatile memories (e.g., for storing software instructions), volatile memories, memory buses, peripherals, inputs, outputs, and any other relevant electronic components or features.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
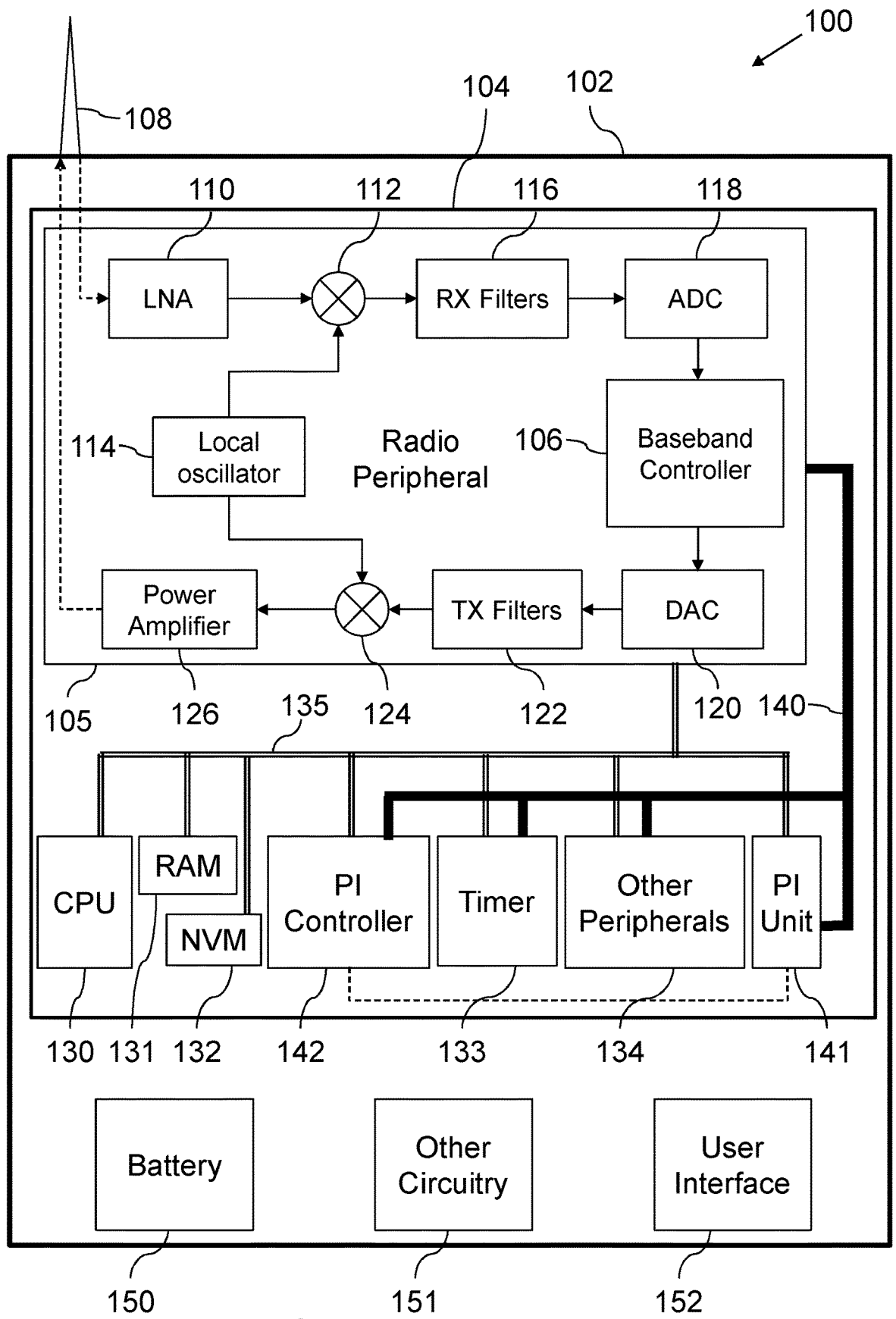
FIG. 1 is a schematic diagram of a radio transceiver, embodying the invention, that comprises a hardware peripheral interface controller.

FIG. 1 shows the major components of an electrical device 100 embodying the invention.

The device 100 may be any radio-equipped device. It could be a smartphone, wireless sensor, radio tag, audio accessory, household appliance, industrial equipment, land vehicle, satellite, etc. In one set of embodiments, the device 100 is a portable consumer-electronics product, such as an audio headset, that can communicate over a Bluetooth™ Low Energy (BLE) communication link.

The electrical device 100 contains, within a housing 102, an integrated-circuit radio-on-a-chip 104 that supports Bluetooth™ Low Energy communications. The chip 104 may additionally support other radio protocols such as IEEE 802.11, 3GPP LTE Cat-M1, 3GPP LTE NB-IoT, IEEE 802.15.4, Zigbee™, Thread™, ANT™, etc. The chip 104 may also support additional operations not directly related to radio communications.

The chip 104 includes:
a system processor (CPU) 130 (e.g. an Arm™ Cortex™ processor);
random access memory (RAM) 131;
non-volatile memory (NVM) 132 (e.g. flash memory);
a hardware timer 133;
a radio peripheral 105; and
other peripherals 134, which may include further timers, input/output (I/O) controllers, cryptographic engines, digital-to-analog converters (DAC), analog-to-digital converters (ADC), temperature sensors, etc.

A bus system 135 (e.g. an Arm™ AMBA bus system) connects to the CPU 130, the RAM 131, the NVM 132, the timer 133, the radio peripheral 105, and the other peripherals 134. The bus system 135 supports direct memory access (DMA) by peripherals that are configured to act as bus masters. The chip 104 implements a system-wide memory map.

The chip 104 also provides a peripheral interconnect (PI) 140, comprising a set of lines and switches connecting between the peripherals 105, 133, 134 of the chip 104. These switches are operated by a peripheral-interconnect (PI) interface unit 141. These lines 140 are separate from the bus system 135 to which the CPU 130 is connected, and can be used to convey signals between event outputs and task inputs of the peripherals 105, 133, 134 without CPU involvement, preferably within a single clock cycle or taking a constant number of clock cycles, such that the timing is predictable. This can avoid allow one peripheral to trigger an operation on another peripheral without needing to wake the CPU 130, or while allowing the CPU 130 to perform other tasks. It can also enable faster and more precise coordination of time-critical actions between the peripherals 105, 133, 134 than is typically possible when signalling using CPU interrupts instead.

Each peripheral event is signalled using two parallel mechanisms: an electrical pulse signal is output from the event output over a dedicated line into the peripheral interconnect 140, where it may be switchably coupled to one or more PI channels; additionally, a value (e.g. a logic 1) is written to a corresponding event-output register for the peripheral (which may be a single-bit register within a larger bit-field register), which can be read by a bus master, such as the CPU 130, over the bus system 135. The event-output register may be cleared after a time, or by a write to an associated "clear" register. Similarly, each peripheral task can be triggered in either of two ways: by an electrical pulse signal to a task input over a dedicated line from the peripheral interconnect 140; or by a value (e.g. a logic 1) being written, by a bus master over the bus system 135, to a corresponding task-input register for the peripheral (which may be a single-bit register within a larger bit-field register).

In particular, the timer 133 contains a set of (e.g. six) compare registers ("Compare 0", "Compare 1", . . . , "Compare 5") each of which can have a desired time value written to it over the bus system 135. Each compare register is associated with a corresponding "TIMER_COMPARE" event output. When the timer 133 is started, the counter in the timer 133 increments steadily. The timer 133 signals a respective "TIMER_COMPARE" event when the counter attains the value specified in the respective compare register. The timer 133 contains a set of task inputs, including a "TIMER_START" task input, for starting the counter, and a "TIMER_STOP" task input for stopping the counter. It may support additional operations, such as capture operations. The chip 104 may contain multiple such timers.

The radio peripheral 105 comprises various event outputs for signalling different radio-related events. These include an "EVENTS_READY" event when the radio has ramped up and is ready to be started; an "EVENTS_ADDRESS" event when an address of a data packet has been sent or received; an "EVENTS_PAYLOAD" event when a payload of a data packet has been sent or received; and an "EVENTS END" event when a packet has been sent or received. The radio peripheral 105 also comprises various task inputs for triggering different radio-related tasks. These include a "RADIO_TXEN" task for enabling the radio in transmit (TX) mode; a "RADIO_RXEN" task for enabling the radio in receive (RX) mode; a "RADIO_START" task for starting the radio; and a "RADIO_STOP" task for stopping the radio.

The PI 140 provides a fixed number of channels (e.g. 16 or 32 channels: "Channel 0", "Channel 1", . . . "Channel 15"), each of which has a first end that can be connected to an event output of a peripheral, and has a second end that can be connected to a task input of the same or another peripheral. The PI interface unit 141 is connected to the bus system 135 and provides a register interface for configuring the peripheral interconnect 140. In particular, it provides configuration registers for each channel, for specifying an event output and a task input to connect to respective ends of the channel. For convenience, event outputs and task inputs may be identified to the PI interface unit 141 using the address values (e.g. unsigned 32-bit integers) of their associated event-output and task-input registers, although in other embodiments a different labelling system could be used.

The CPU 130 can thus configure the PI interface unit 141, over the bus system 135, to connect an event output of one peripheral, such as the timer 133, to a task input of another peripheral, such as an I/O controller, before the timer event has been signalled, and the relevant task operation can then be triggered at a later time without further involvement from the CPU 130.

The peripheral interface 140 and its interface unit 141 may, in some embodiments, have some or all of the features of the "programmable peripheral interconnects" disclosed in the applicant's earlier publication WO 2013/088121.

The radio chip 104 also contains a novel scriptable peripheral-interface controller 142, which is coupled to the bus system 135 as a DMA bus master. In some embodiments, there may additionally be a direct connection between the PI controller 142 and the PI interface unit 141 (shown as a dashed line in FIG. 1). The operations of the PI controller 142 are described in more detail below.

The radio transceiver peripheral 105 contains a baseband controller 106. This comprises dedicated hardware logic. It may, in some embodiments, also comprise memory for storing radio-transceiver firmware and a baseband processor for executing the radio-transceiver firmware (e.g. an Arm™ Cortex™ processor). The baseband controller 106 may also include one or more DSPs or further processors.

The baseband controller 106 is connected to one or more radio antennae 108 by a transmit path for transmitting digital radio signals, and by a receive path for receiving incoming digital radio signals. The receive path includes: a low-noise amplifier (LNA) 110; a quadrature mixer 112 for downmixing an incoming radio-frequency (e.g. 2.4 GHz) signal to an intermediate frequency (IF) or to baseband, by mixing the RF signal with a periodic signal generated by a local oscillator 114; a set of analog receive filters 116; and an analog-to-digital converter (ADC) 118. The transmit path includes: a digital-to-analog converter (DAC) 110; a set of analog transmit filters 122; a quadrature mixer 124 for up-mixing a baseband signal to a radio frequency (RF) signal using a periodic signal generated by the local oscillator 114; and a power amplifier (PA) 126. The transmit and receive paths may also include other components such as RF filtering between the antenna 108 and the LNA 110 or PA 226.

The baseband controller 106 performs digital operations on the transmit and receive paths. For example, for the receive path, it implements digital filtering and GFSK demodulation, while for the transmit path, it implements GFSK modulation and digital filtering. It may also perform further operations, including higher-level operations such as assembling and disassembling data packets, generating and verifying checksums, cryptographic operations, etc.

When receiving a radio signal, the radio peripheral 105 down-mixes the incoming RF signal to an intermediate frequency, or to baseband, using the receive mixer 112. It samples the down-mixed signal using the ADC 118 operating at a sampling rate, set by a sample clock signal, in order to generate a digital representation of the signal. The sampled signal can be digitally filtered and GFSK-demodulated in the baseband controller 106.

When transmitting a radio signal, the baseband controller 106 outputs digital samples representing a GFSK-modulated signal to the DAC 110 at the same sampling rate, set by the sample clock signal. These are then filtered by the transmission filters 222 and up-mixed by the mixer 224 for transmission.

The device 100 may also include a battery 150, other circuitry 150, and a user interface 152. The nature of the other circuitry 150 and the user interface 152 will depend on the intended purpose of the device 100. The other circuitry 150 may include components such as crystal oscillators, digital logic, analog circuitry, discrete active components, discrete passive components, further processors, further chips, etc. The user interface 152 may include a display screen, buttons, etc.

The device 100 may be a component of a larger device, such as a car or a domestic appliance, or it may be a standalone electronic device.

The radio antennae 108 may be within the housing 102 or external to the housing 102, and may be connected to the chip 104 by appropriate components, or may be integrated onto the chip 104.

Figure 2:
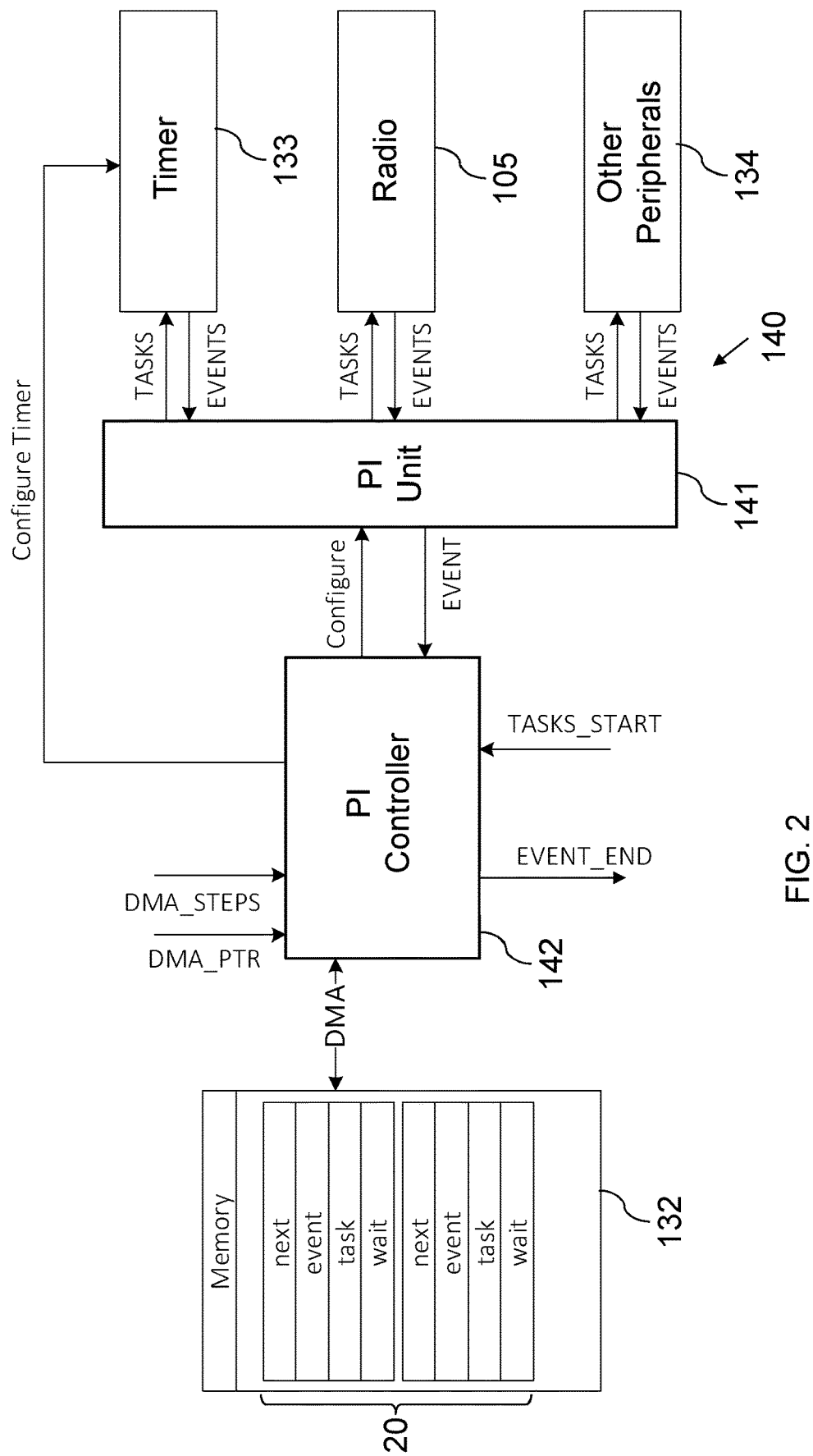
FIG. 2 is a schematic diagram showing more detail of the peripheral interconnect and related components in the radio transceiver.

FIG. 2 provides more detail of the PI interface unit 141 and PI controller 142.

The PI controller 142 in this embodiment is implemented in hardware—i.e. using dedicated circuitry, comprising registers and combinational logic gates, rather than using software executing on a general-purpose processor. Although it is not a processor (e.g. it does not contain an arithmetic logic unit or floating-point unit for performing arbitrary arithmetic or logic operations determined by processor instructions) its operations can be controlled by a script stored in the RAM 131 or NVM 132. Each script comprises structured data, encoding a sequence of instructions for reconfiguring the PI 140 and for reconfiguring the timer 133. The PI controller 142 interprets the instructions in the script and implements each instruction by updating the configuration of the PI 140 and timer 133, at successive moments in time, according to the respective instructions. The script also tells the PI controller 142 when to perform each configuration update.

The PI controller 142 exposes a register interface over the bus system 135, which software executing on the CPU 130 can use to configure the PI controller 142. In particular, the CPU 130 can write to an input register "DMA_PTR" to specify a memory address at which the start of a script is located, for the controller 142 to interpret. The CPU 130 writes the number of instructions in the script to a "DMA_STEPS" input register. (In other embodiments, the script may contain a special end-of-script marker instead, which the PI controller 142 can recognise.)

The PI controller 142 has a task input "RADIO_START" which can receive an event signal on a line from the PI 140, and which can also be triggered by a write to an associated task-input register over the bus system 135. When triggered (e.g. by a peripheral event or by the CPU 130), this task input causes the PI controller 142 to start interpreting the script.

The PI controller 142 has a task input labelled "EVENT" in FIG. 2, on which it can receive an event signal on a line from the PI 140. When triggered by a peripheral event, this "EVENT" task causes the PI controller 142 to advance to implementing the next instruction the script.

The PI controller 142 has an event output "EVENT_END" for signalling when it has reached the end of a script.

The PI controller is a bus master on the bus system 135, and uses direct memory access (DMA) to read scripts from the memory 131, 132. It can also write configuration data to the register interface of the PI interface unit 141 over the bus system 135 (or over a dedicated connection in some embodiments). It can also write configuration data to the timer 133 over the bus system 135 (or over a dedicated connection in some embodiments).

An example script 20, stored in the NVM 132, is shown in FIG. 2. This example has only two instructions, but a script may contain any number of instructions, from one upwards. In general, though, a script will typically have at least two instructions, as it is likely to be more efficient to configure the PI unit 141 directly than to create a single-instruction script. A script may have ten, a hundred or more instructions.

The instructions are stored linearly in increasing sequential address ranges, so that the PI controller 142 can read successive instructions simply by advancing an address pointer by uniform steps. Each instruction contains four values: a "next" value, an "event" value, a "task" value, and a "wait" value. These may each hold a respective 32-bit unsigned integer (uint32) value, although this may be implementation specific.

The "next" value represents a future time, as a new "compare" value for the timer 133.

The "event" value identifies a first event output of a peripheral (e.g. as the address of the associated event-output register).

The "task" value represents a peripheral task input (e.g. as the address of the associated task-input register).

The "wait" value represents a second event output of a peripheral (e.g. as the address of the associated event-output register).

When the "RADIO_START" task is triggered, the PI controller 142 reads the first instruction from the script 20. The PI controller 142 first writes the address of its own "EVENT" task-input register to the task register for "Channel 1" in the PI unit 141 (or another reserved channel), if this is not already set (e.g. hard-wired).

The PI controller 142 then implements the first instruction by:
 (i) writing the "next" value to the "Compare 0" register of the timer 133 (or another reserved compare register);
 (ii) writing the "event" value to the event register for "Channel 0" in the PI unit 141 (or another reserved channel);
 (iii) writing the "task" value to the task register for "Channel 0" in the PI unit 141; and
 (iv) writing the "wait" value to the event register for "Channel 1" in the PI unit 141.

It then waits until the "EVENT" task is triggered (in response to the event identified by the "wait" value), whereupon it reads the next instruction from the script 20, and performs the same four steps (i)-(iv) for the current instruction.

This repeats until it has implemented the last instruction, as indicated by the value in the "DMA_STEPS" register. It then waits for a final "EVENT" task, in response to which it signals the completion of the script on the "EVENT_END" event output. In some embodiments, it may also send an interrupt to the CPU 130 to alert software on the CPU 130 to this completion.

This script mechanism provides a very flexible way of dynamically reconfiguring the PI 140 without CPU 130 involvement. This can be useful for fast, timing-critical activities, such as controlling radio transmissions in a two-way distance ranging operation, where cycle-accurate behaviour may be required. However, it may also be useful for other purposes, such as cryptographic operations, or data input-output operations (e.g. toggling general-purpose input-output GPIO pins), where timing may be important and/or where it is desirable to allow the CPU 130 to sleep, or to be freed to perform other activities.

Although it is not mandatory for a script to use the timer 133 at all (in which case the "next" values in the script could all be set to a null or arbitrary value), it is envisaged that, typically, at least some, or all, of the instructions in a script will have their "event" and/or "wait" values set to the "TIMER_COMPARE" event output of the "Compare 0"

compare register of the timer 133 (which is the same compare register to which the "next" value is written). In this way, the script can be used to control the time at which the peripheral task input, identified in the instruction, will be triggered, to single-cycle accuracy. It can also use the timer 133 to control the time at which the PI controller 142 will advance to implement the next successive instruction (in general, this step will not need to be cycle-accurate, so long as the next configuration is in place before the "next" time of the next instruction). If the "event" and "wait" values are both set to the same timer "TIMER_COMPARE" event output, the same timer event will trigger the action identified by the "task" value and cause the PI controller 142 to update the PI configuration through the PI interface unit 141.

One exemplary radio process that uses scripting of the PI 140 is described below, with reference to FIGS. 4 & 5.

Figure 3:
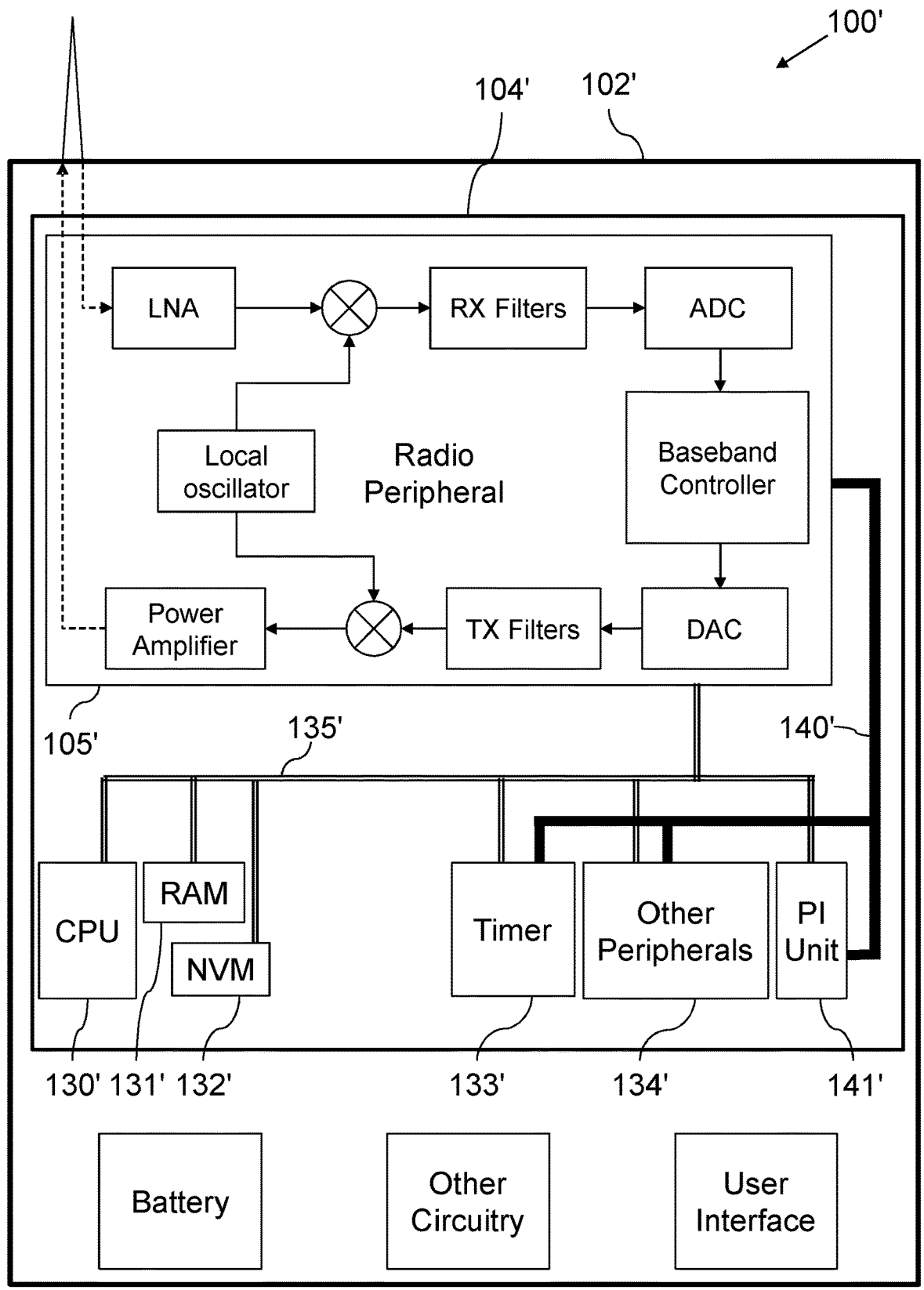
FIG. 3 is a schematic diagram of a variant radio transceiver, also embodying the invention, that uses a software-based peripheral interface controller.

FIG. 3 shows an alternative embodiment of a device 100' that is the same as the device 100 of FIG. 1 in most respects, except that it lacks the dedicated hardware PI controller 142. Instead, it has PI-controller software stored in the NVM 132', which is executed by the CPU 130', that provides the same functionality as the hardware PI controller 142. This may be advantageous in not requiring dedicated hardware to be designed and implemented, reducing costs and chip size, and in providing greater flexibility in the operations carried out by the software. However, it may be disadvantageous in placing more processing load on the CPU 130' which may increase power consumption and/or prevent the CPU 130' from performing other processing operations.

The PI controller software may be part of a larger firmware for the chip 104'. As with the hardware PI controller 142, the software routine accesses a script at an address in the RAM 131' or 132'. The script may have been written there from outside the chip 104', or may have been stored by a different software application executing on the chip 104', or may be static data linked to the PI controller software.

The software may be configured to interpret scripts having exactly the same script values as described above, but in some embodiments the scripts may contain different values. In particular, they may use function pointers to invoke different software routines, which in turn configure the timer 133' and the PI interface unit 141'. This can allow for additional operations to be performed by augmenting these software routines, where desired.

Thus, in some embodiments, a script contains a sequence of instructions, in which each instruction comprises: a "next" value that is a timer compare value, exactly as before (e.g. an unsigned integer); an "event" function pointer; a "task" function pointer; and a "wait" function pointer. These function pointers have void return values.

Each "event" function pointer points to a respective helper software function that writes a particular value (e.g. compiled as a constant within the function) to the event register for "Channel 0" in the PI unit 141, over the bus system 135'. Each "task" function pointer points to a respective helper software function that writes a particular value to the task register for "Channel 0" in the PI unit 141, over the bus system 135'. Each "wait" function pointer points to a respective helper software function that repeatedly polls a particular event-output register (such as the "Compare 0" register of the timer 133), until it changes value.

Some instructions may point to the same helper functions, but in general each instruction could contain pointers to a different set of functions. The helper functions may also perform additional actions, where desired.

The controller software may read a script by executing a script-interpreting routine similar to the follow (in pseudocode):

```
for (int i = 0; i < length_of_script; i++)
{
    instruction = instructions[i];
    timer __next__event__in(instruction->next);
    instruction->event( );
    instruction->task( );
    instruction->wait( );
}
``` where instructions [length_of_script] is an array of instructions, defining the script, that is stored in the RAM 131'.

Since the CPU 130' is not directly connected to the peripheral interface lines 140', the "wait" helper functions repeatedly poll a peripheral event register (e.g. of the timer 133') until they detect the desired event. This may undesirably block the CPU 130', especially if the script covers a protracted span of time. In other embodiments, an interrupt mechanism may be used to cause the controller software to advance from one instruction to the next.

Figure 4:
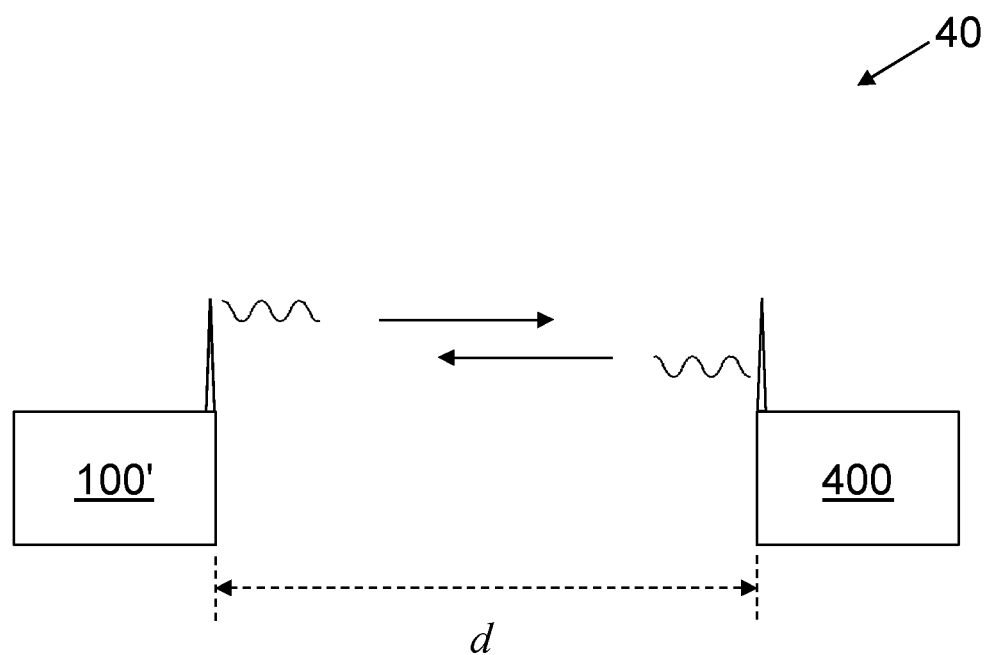
FIG. 4 is a schematic drawing of the variant radio transceiver performing a phase-based ranging operation with a second radio transceiver also embodying the invention.

FIG. 4 shows an example of the radio transceiver device 100' engaging in a two-way multi-carrier phase-ranging (MCPR) procedure with a second radio transceiver device 400, for determining the separation distance, d, between the two devices. This is shown to illustrate some of the benefits of the scripting mechanism disclosed herein.

The second device 400 may be similar or identical in hardware to the first device 100'. It may be loaded with the same firmware, which may include complementary routines for each device to perform a respective part in the MCPR procedure. In particular, the second device 400 contains a system CPU 130", timer 133", and radio peripheral 105", substantially the same as those in the first device 100', as well as other hardware features (PI, PI interface unit, etc.).

In order to provide reasonably precision and accuracy at short and medium ranges (e.g. over typical Bluetooth™ ranges of up to tens of metres), the MCPR procedure requires the timing of the radio signals exchanged between the devices 100', 400 to be synchronized to less than a microsecond. It is also advantageous that the time difference between events (e.g. between receiving a radio signal and transmitting a response radio signal) is a known number of clock cycles. Such timing precision is not easily achievable when controlling the radio peripheral 105' from software executing on the system CPU 130'.

However, by accessing a suitable script in the memory 131', 132' of the chip 104', the CPU 130' can be flexibly controlled to reconfigure the timer 133' and PI unit 141' in a sequence of different configurations that enables the PI 140' to be used to provide cycle-accurate performance of the MCPR procedure, even over many rounds (e.g. eighty or more rounds over different carrier frequencies).

Figure 5:
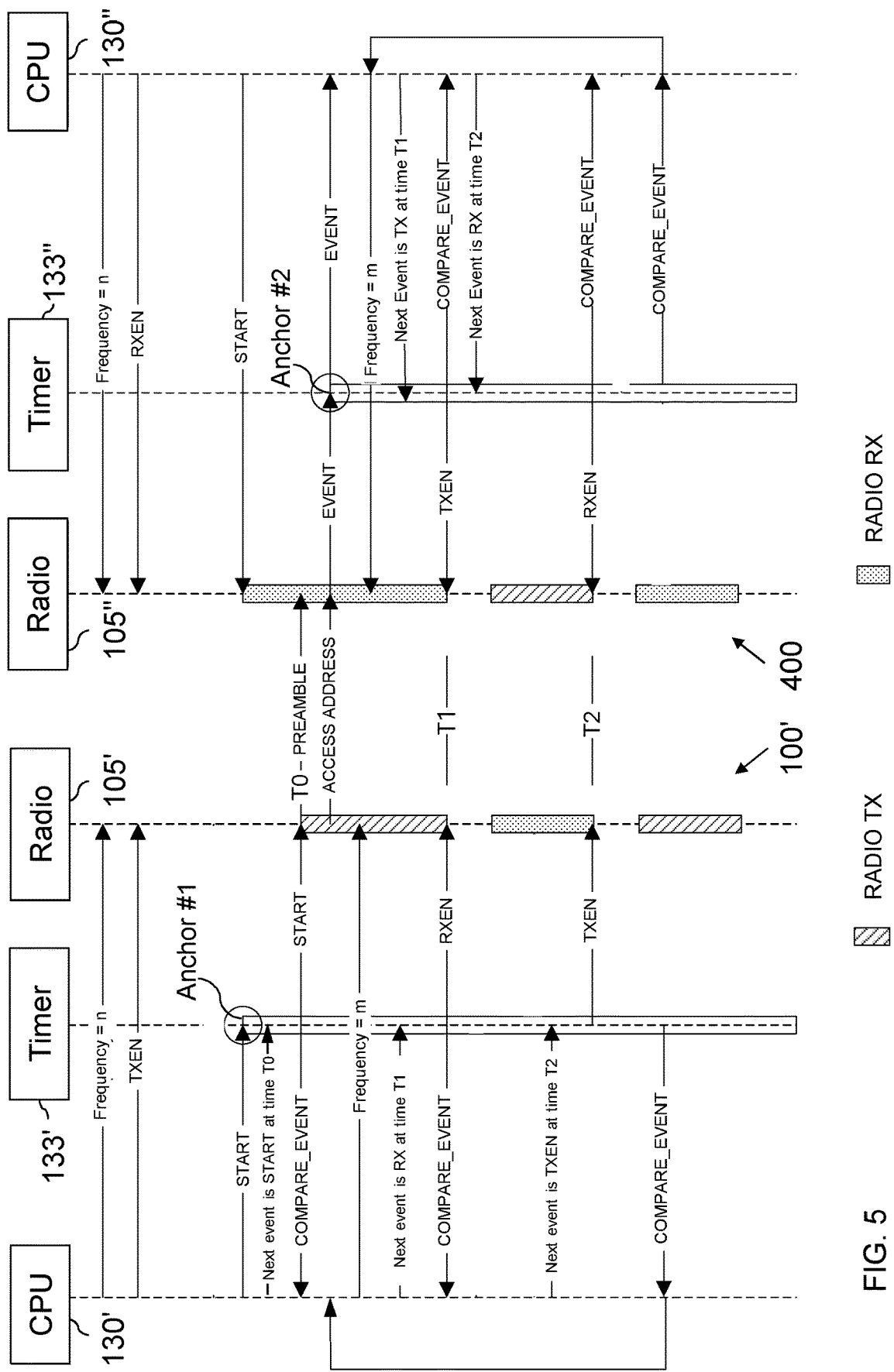
FIG. 5 is a sequence diagram of the phase-based ranging operation and associated internal operations of the radio transceivers.

FIG. 5 shows an example of the first two rounds of such an MCPR procedure performed by the first device 100' (on the left side) and the second device 400 (on the right side).

First, the CPU 130' of the first device 100' sends a configuration message to the radio peripheral 105', over the bus system 135', to set it to a first carrier frequency, n. It also writes to the "RADIO_TXEN" task register to enable the radio for transmission.

The CPU 130" of the second device 400 similarly sends a configuration message to its radio peripheral 105", over its bus system, to set the radio to the first carrier frequency, n, and writes to the "RADIO_RXEN" task register to enable the radio for reception. It then writes to the "RADIO_START" task register to start the radio receiving.

The first CPU 130' then starts its timer 133'. This action provides a timing anchor "Anchor #1" for the procedure.

The first CPU 130' then starts interpreting an initiator script for performing the MCPR procedure as an "initiator" device. The second CPU 130" uses a reflector script for performing the MCPR procedure as a "reflector" device.

The first instruction of the initiator script specifies a "next" value of T0; an "event" helper function that instructs the PI interface unit 141' to connect the input end of "Channel 0" of the PI to the "TIMER_COMPARE" event of the "Compare 0" compare register of the timer 133'; a "task" helper function that instructs the PI interface unit 141' to connect the output end of "Channel 0" of the PI to the "RADIO_START" task of the radio peripheral 105; and a "wait" helper function that polls the event register associated with the "TIMER_COMPARE" event of the "Compare 0" compare register of the timer 133'.

The first CPU 130' implements this first instruction by first writing a compare time of T0, from the "next" parameter, to the "Compare 0" register of the timer 133', then executing the "event" helper function, then executing the "task" helper function, then executing the "wait" helper function. This "wait" function blocks the CPU 130' until time T0. When the timer 133' reaches the counter value T0, the "TIMER_COMPARE" event triggers the "RADIO_START", causing the radio 105' to transmit the preamble of a first data packet, followed by an access address of the data packet. The "wait" helper function executing on the first CPU 130' also detects the "RADIO_START" event at time T0, through its polling. Before exiting, the "wait" helper function sets the radio peripheral 105' frequency to a new value, m, through a register interface to the radio peripheral 105'. The PI controller algorithm then loops round to implement the second instruction from the script.

The CPU 130" of the second device 400 has meanwhile started interpreting the reflector script. The first instruction causes the second CPU 130" to configure its PI to connect an "access-address-received" event of the radio 105", through PI "Channel 0", to a "TIMER_START" event for the timer 133". A correlator in the radio peripheral 105" of the second device 400 detects the arrival of the access address in the data packet and signals the reception event, which causes the timer 133" to start with clock-cycle accuracy (i.e. with a delay of known number of cycles). This fixes a timing anchor "Anchor #2" for the second device 400, which is related to "Anchor #1" by an amount that can be known precisely, apart from the time-of-flight separation distance, d. The timers of the two devices 100', 400, which are not externally synchronized, have nevertheless thereby become anchored together for the purposes of performing the MCPR procedure. The "wait" function of the first reflector instruction polls an event register of the radio 105" associated with the "access-address-received" event. On detecting the event from a change in the register value, the PI controller algorithm sets the radio peripheral 105" to the new frequency, m, before looping round to implement the second instruction.

Meanwhile, the second instruction of the initiator script causes the first CPU 130' to set the "Compare 0" register of the timer 133' to a new time T1. It run the same "event" helper function, since the input to "Channel 1" continues to be the same "TIMER_COMPARE" event for the "Compare 0" register. It runs a different "task" helper function, which connects the output of "Channel 1" to the "RADIO_RXEN" task input of the radio peripheral 105'. It then invokes the same "wait" function, which polls the "Compare 0" event-output register.

The third instruction of the initiator script sets the timer 133' compare register to a time T2 and connects the corresponding "TIMER_COMPARE" event to the "RADIO_TXEN" task of the radio 105', through PI "Channel 0". It then waits by polling for the same timer event.

Meanwhile, the second instruction of the reflector script sets the timer 133" compare register to the time T1. Note that the actual counter value for this time T1 will differ from the counter value used by the initiator script, since the two anchor points are offset be a known amount. The true times of "T1" determined by the two devices 100', 400 will also be offset in reality by an amount dependent on the distance, d, between the two devices. The "event" and "task" helper functions of the second instruction connect the corresponding "TIMER_COMPARE" event to the "RADIO_TXEN" task of the radio 105', through PI "Channel 0". It then waits by polling for the same timer event.

The third instruction of the reflector script sets the timer 133" compare register to the time T2 and connects the corresponding "TIMER_COMPARE" event to the "RADIO_RXEN" task of the radio 105", through PI "Channel 0". It then waits by polling for the same timer event.

The initiator and reflector scripts both continue in similar fashion for successive carrier frequencies, causing the respective radio peripherals 105', 105" to alternately transmit and receive data packets containing constant-frequency portions (i.e. pure sine wave tones) on the different carrier frequencies. The timing information obtained by the radio peripherals 105', 105" can be processed to determine the distance, d, using a MCPR algorithm, but with cycle-accurate timing.

Although this ranging procedure has been described as being performed using software-based PI controllers, it could equally be implemented using the hardware PI controller of the device 100 of FIG. 1, by one or both of the parties, using equivalent scripts. The frequency changes are not time critical, so long as they occur somewhere between the successive timer events, and so may be implemented by software executing on the CPUs in response to interrupts issued by the respective timers, or by register polling algorithms running on the CPUs.

In other embodiments, similar initiator and reflector scripts may be used to implement a round-trip-timing (RTT) ranging procedure, or any other time-sensitive radio protocol.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. An electronic device comprising:
   a plurality of peripherals each peripheral comprising one or more event outputs or task inputs;
   a peripheral interconnect, coupled to each of the peripheral event outputs and peripheral task inputs;
   a controller for configuring the peripheral interconnect;
   a memory; and
   a bus system, communicatively coupled to the controller and to the memory,
   wherein the peripheral interconnect comprises:
   an input for receiving configuration data from the controller; and circuitry, responsive to the received configuration data, for selectively connecting peripheral event outputs to peripheral task inputs, and wherein the controller is configured to:

access, over the bus system, a script comprising a sequence of instructions, stored in the memory, the sequence comprising a first instruction and one or more subsequent instructions, wherein each instruction identifies a first peripheral event output, a peripheral task input, and a second peripheral event output;

implement each instruction of the sequence of instructions by sending respective configuration data to the peripheral interconnect for configuring the peripheral interconnect to connect the first peripheral event output identified by the instruction to the peripheral task input identified by the instruction; and implement each subsequent instruction in the sequence of instructions in response to detecting an event signalled from the second peripheral event output identified by the preceding instruction in the sequence of instructions.

2. The electronic device of claim 1, wherein the plurality of peripherals includes a hardware timer, wherein the hardware timer comprises:

a configuration input for receiving configuration data representative of a time;

a timer event output; and circuitry, responsive to the received configuration data, for signalling a timer event from the timer event output at said time.

3. The electronic device of claim 2, wherein each instruction of the script further identifies a respective time, and the controller is configured to send configuration data to the hardware timer for configuring the hardware timer to signal a respective timer event at the respective time.

4. The electronic device of claim 3, wherein the controller is configured to send the respective configuration data to the hardware timer sequentially when implementing each instruction of the script.

5. The electronic device of claim 1, wherein the peripheral interconnect supports a plurality of simultaneous channels, each channel connecting a respective event output to a respective task input, and wherein the controller is configured, when implementing each instruction of the script, to instruct the peripheral interconnect to use a common channel for connecting the first peripheral event output to the peripheral task input.

6. The electronic device of claim 1, having a script stored in the memory.

7. The electronic device of claim 6, wherein the script occupies a contiguous address range in the memory, with the sequence of instructions stored in sequence through an address space of the memory.

8. The electronic device of claim 1, wherein the controller is configured to access the script by reading from a contiguous block of the memory and to access each successive instruction of the sequence of instructions by incrementing an address pointer through the memory.

9. The electronic device of claim 1, further comprising a processor, communicatively coupled to the controller and to the memory, and wherein the controller is implemented by software instructions, stored in the memory, for execution by the processor.

10. The electronic device of claim 9, wherein the controller is configured to execute one or more software helper functions, stored in the memory, that are associated with the script, wherein each instruction in the script identifies one or more of the first peripheral event output, the peripheral task input, and the second peripheral event output, by a pointer to a respective software helper function, wherein the respective software helper function comprises data that identifies the respective event output or task input.

11. The electronic device of claim 9, wherein the controller is configured, when implementing each instruction, to detect an event signalled from the second peripheral event output, identified by the instruction, by polling a register associated with the second peripheral event output.

12. The electronic device of claim 1, wherein the controller is implemented by hardware circuitry, independently of any processor of the electronic device.

13. The electronic device of claim 12, wherein the controller is a bus master on the bus system and is configured to use direct memory access to read the script from the memory.

14. The electronic device of claim 12, wherein the controller comprises a controller task input coupled to the peripheral interconnect, and wherein the controller is configured, when implementing each instruction, to send configuration data to the peripheral interconnect for configuring the peripheral interconnect to connect the second peripheral event output, identified by the instruction, to the controller task input, so as to detect an event signalled from the second peripheral event output over the peripheral interconnect.

15. The electronic device of claim 1, wherein the plurality of peripherals includes a radio peripheral, wherein the radio peripheral comprises:

radio transceiver circuitry; and one or more task inputs, each associated with a different operation of the radio transceiver circuitry, wherein the radio transceiver circuitry is configured to perform a respective operation in response to receiving an electrical signal at the respective task input of the plurality of task inputs.

16. The electronic device of claim 15, wherein the radio peripheral comprises one or more event outputs, each associated with a different event detected by the radio transceiver circuitry, and wherein the radio transceiver circuitry is configured to output an electrical signal from the respective event output in response to detecting the respective event.

17. The electronic device of claim 15, wherein the memory stores a script for configuring the peripheral interface for performing a radio ranging procedure by connecting a hardware timer of the device to a plurality of different task inputs of the radio peripheral at different respective times.

18. The electronic device of claim 15, wherein the radio peripheral supports a Bluetooth™ radio protocol.

19. The electronic device of claim 1, wherein the device is an integrated-circuit system-on-chip.

20. A method of operating an electronic device, wherein the electronic device comprises:

a plurality of peripherals each peripheral comprising one or more event outputs or task inputs;

a peripheral interconnect, coupled to each of the peripheral event outputs and peripheral task inputs;

a controller for configuring the peripheral interconnect;

a memory; and a bus system, communicatively coupled to the controller and to the memory, wherein the peripheral interconnect comprises:

an input for receiving configuration data from the controller; and circuitry, responsive to the received configuration data, for selectively connecting peripheral event outputs to peripheral task inputs, the method comprising the controller:

accessing, over the bus system, a script comprising a sequence of instructions, stored in the memory, the sequence comprising a first instruction and one or more subsequent instructions, wherein each instruction identifies a first peripheral event output, a peripheral task input, and a second peripheral event output;

implementing each instruction of the sequence of instructions by sending respective configuration data to the peripheral interconnect for configuring the peripheral interconnect to connect the first peripheral event output identified by the instruction to the peripheral task input identified by the instruction; and implementing each subsequent instruction in the sequence of instructions in response to detecting an event signalled from the second peripheral event output identified by the preceding instruction in the sequence of instructions.

* * * * *